United States Patent [19]
Takeuchi

[11] Patent Number: 5,904,309
[45] Date of Patent: May 18, 1999

[54] SPINNING REEL FOR FISHING HAVING A ROTOR BRAKE MEMBER OPERABLE IN THE FISHING LINE CASTING POSITION

[75] Inventor: Shinji Takeuchi, Hiroshima, Japan

[73] Assignee: Daiwa Seiko, Inc., Tokyo, Japan

[21] Appl. No.: 08/731,930

[22] Filed: Oct. 16, 1996

[30] Foreign Application Priority Data

Oct. 16, 1995 [JP] Japan .................................. 7-266880
Jan. 24, 1996 [JP] Japan .................................. 8-010013

[51] Int. Cl.$^6$ .................................................. A01K 89/02
[52] U.S. Cl. .......................... 242/243; 242/232; 242/245; 242/246
[58] Field of Search ..................................... 242/231, 232, 242/233, 243, 244, 245, 246, 247, 248

[56] References Cited

U.S. PATENT DOCUMENTS

| | | |
|---|---|---|
| 3,045,942 | 7/1962 | Henze . |
| 3,586,255 | 6/1971 | Monthulet . |
| 4,426,045 | 1/1984 | Gifford .................................. 242/232 |
| 4,509,705 | 4/1985 | Councilman et al. . |
| 4,513,926 | 4/1985 | Tsunoda et al. ......................... 242/231 |
| 4,898,339 | 2/1990 | Takeuchi .................................. 242/231 |
| 5,295,640 | 3/1994 | Kawabe .................................. 242/248 |

FOREIGN PATENT DOCUMENTS

| | | |
|---|---|---|
| A1 0 026 084 | 4/1981 | European Pat. Off. . |
| A1 0 467 812 | 1/1992 | European Pat. Off. . |
| 905 268 | 1/1946 | France . |
| 1 561 190 | 3/1969 | France . |
| 2 462 098 | 2/1981 | France . |
| 3-16867 | 2/1991 | Japan . |

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

In a spinning reel for fishing, a brake member is attached to a rotor, which, when a bail support member is operated or reversed from its fishing line retrieving state to its fishing line casting state, is pressed against a spool to thereby brake the rotation of the rotor. The bail support member can be returned from the fishing line casting state to the fishing line retrieving state through a reversing mechanism if the rotor is rotated with a handle in the fishing line retrieving direction. The spinning reel for fishing can prevent the inadvertent operation of a bail in a fishing line casting operation and thereby improve the fishing operation of the spinning reel.

17 Claims, 9 Drawing Sheets

SPINNING REEL FOR FISHING HAVING A ROTOR BRAKE MEMBER OPERABLE IN THE FISHING LINE CASTING POSITION

BACKGROUND OF THE INVENTION

The present invention relates to a spinning reel for fishing which can prevent incorrect operation of a bail in a fishing line casting operation and can improve the fishing operation of the spinning reel.

As known well, conventionally, in most spinning reels for fishing, a semi-circular bail is mounted on the leading end portions of a pair of support arms provided in a rotor in such a manner that it can be freely reversed between a fishing line retrieving position and a fishing line casting position through a bail support member.

If the bail is turned down to the fishing line casting position and the terminal tackles of the spinning reel are thrown, then a fishing line wound around a spool can be released in a spiral manner. Also, if the bail is returned back to the fishing line retrieving position and a handle is operated to thereby rotate the rotor in a fishing line retrieving direction, then the fishing line can be wound around the spool, which traverses back and forth in connection with the rotation of the rotor.

However, conventionally, in the spinning reel of this type, there is a drawback that, when the bail is turned down to the fishing line casting position and the fishing line is released, the handle can be turned due to the casting motion to thereby rotate the rotor in the fishing line retrieving direction. This may result in the bail support member being reversed to the fishing line retrieving position by a reversing mechanism and the fishing line can thereby be cut.

In order to solve the above-mentioned problem, recently, for example, as disclosed in Japanese Utility Model Publication No. Hei. 3-16867, there has been proposed a lock device in which a connecting member having a leading end portion engageable with the bail support member and a trailing end portion engageable with an uneven portion provided in the front portion of a reel main body when the fishing line is released is so mounted as to extend from the interior of the rotor into the support arms, so that the fishing line casting state of the bail support member can be locked by the connecting member.

However, since the above-mentioned lock device is structured such that the leading end portion of the connecting member is engaged with the bail support member and the trailing end portion of the connecting member is engaged with the uneven portion provided in the front portion of the reel main body, there is a drawback that the base portions of the support arms and the front portion of the reel main body are complicated in shape and structure.

Also, because the present lock device is so structured as to lock the rotor to the reel main body through the connecting member in the fishing line casting operation, the bail cannot be reversed and returned from its fishing line casting state to its fishing line retrieving state with the rotation of the rotor by means of the handle retrieving operation, which results in a poor efficiency in the operation of the lock device.

SUMMARY OF THE INVENTION

The present invention aims at eliminating the drawbacks found in the above-mentioned conventional spinning reels for fishing. Accordingly, it is an object of the invention to provide a spinning reel for fishing which can prevent incorrect operation of a bail in a fishing line casting operation and can improve the fishing operation of the spinning reel.

In attaining the above object, according to the invention, there is provided a spinning reel for fishing of a type in which a bail is mounted on a pair of support arms respectively provided in a rotor rotatable in conjunction with the operation of a handle in such a manner that the bail can be freely reversed between a fishing line casting position and a fishing line retrieving position through a bail support member. The fishing line can be wound around a spool when the rotor is rotated in a fishing line retrieving direction. The rotor includes a brake member which, as the bail support member is reversed from its fishing line retrieving position to its fishing line casting position, is pressed against the spool to thereby brake the rotation of the rotor. The bail support member is returned through a reversing mechanism from the fishing line casting position to the fishing line retrieving position by rotating the rotor in the fishing line retrieving direction.

According to the inventive spinning reel for fishing, if the bail support member is operated or switched from its fishing line retrieving state to its fishing line casting state, then the brake member provided in the rotor is pressed against the spool to thereby brake the rotation of the rotor, which in turn prevents incorrect operation of the bail support member in the fishing line casting operation.

Then, if the rotor is rotated in the fishing line retrieving direction by operating the handle, the bail support member can be returned from the fishing line casting state to the fishing line retrieving state through the reversing mechanism.

In an embodiment of the invention, the spinning reel for fishing is structured as follows: the brake member comprises a brake member main body, which is fixedly secured inside the support arms of the rotor and can be deformed as the bail support member is operated, and a brake portion to be mounted on the leading end portion of the brake member main body. The brake portion projects from within the support arms toward the spool to be thereby pressed against a cylindrical portion of the spool by operating the bail support member from the fishing line retrieving position to the fishing line casting position.

In this case, if the bail support member is operated from the fishing line retrieving state to the fishing line casting state, then the brake member main body is deformed to thereby cause the brake portion to project from within the support arms toward the spool and thus to press against the cylindrical portion of the spool, so that the faulty operation of the bail support member can be prevented.

In another embodiment of the invention, the spinning reel for fishing is structured as follows: the brake member comprises a brake member main body fixedly secured to a front wall portion of the rotor and shiftable in position by means of the operation of the bail support members. The brake member further comprises a brake portion provided in said brake member main body, whereby the brake portion can be shifted in the direction of a cylindrical portion of the spool to be thereby pressed against the cylindrical portion of the spool by operating the bail support member from the fishing line retrieving position to said fishing line casting position.

In this case, if the bail support member is operated or reversed from the fishing line retrieving state to the fishing line casting state, then the brake member main body is shifted in position to thereby cause the brake portion to move in the direction of the cylindrical portion of the spool and thus to press against the inner periphery of the present cylindrical portion, so that incorrect operation of the bail support members can be prevented.

DETAILED DESCRIPTION OF THE PREFERRED EMBODIMENTS

Now, description will be given below in detail of the embodiments of a spinning reel for fishing according to the invention with reference to the accompanying drawings.

Figure 1:
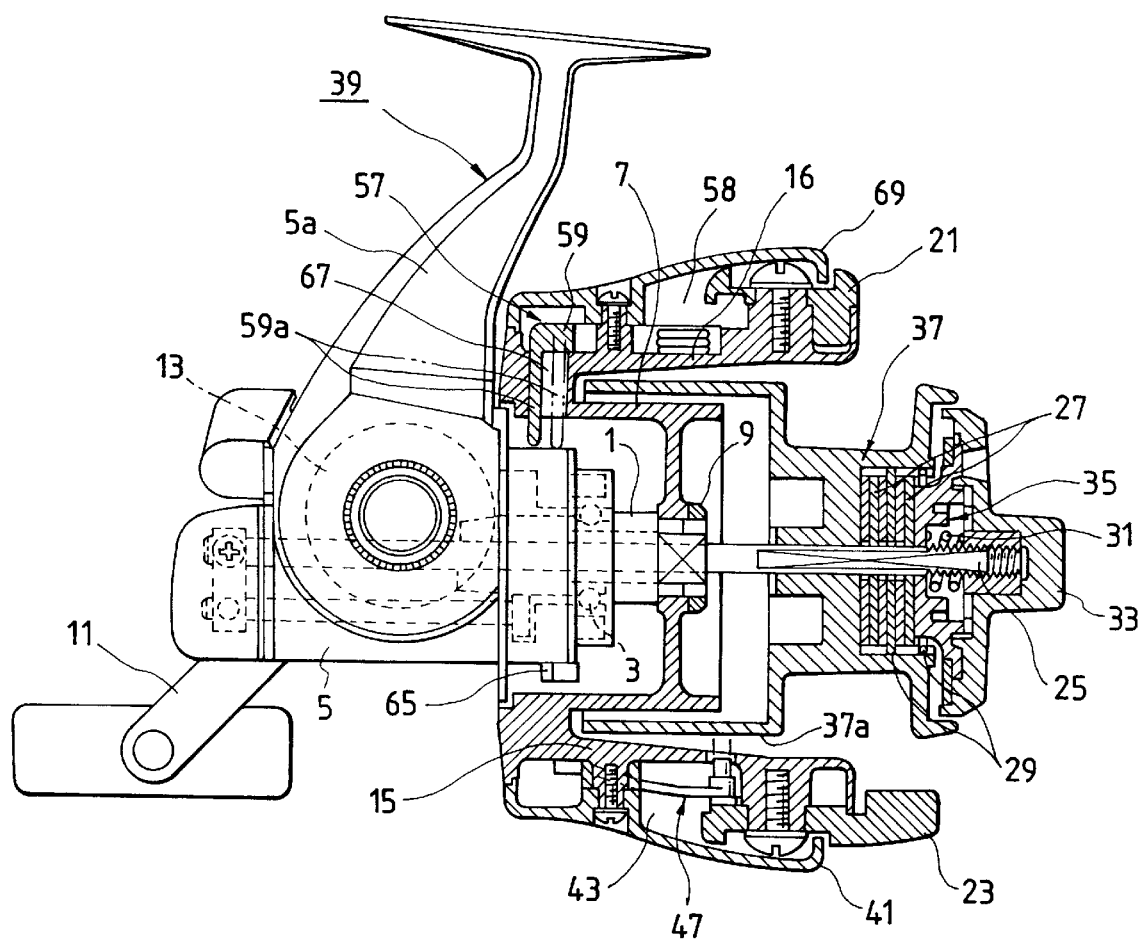
FIG. 1 is a section view of the main portions of a first embodiment of a spinning reel for fishing according to the invention.

FIG. 1 shows a first embodiment of a spinning reel for fishing according to the invention and, in FIG. 1, reference character 1 designates a hollow flier shaft which is rotatably journaled on the front portion of a reel main body 5 through a bearing 3, while a rotor 7 is fixed to the leading end portion of the flier shaft 1 by a nut 9. A pinion is formed in the rear end portion of the flier shaft 1 and a drive gear 13 is fixed to a handle shaft of a handle 11, while the drive gear 13 is in mesh with the pinion. The rotor 7 can be rotated by operating or turning the handle 11.

Figure 2:
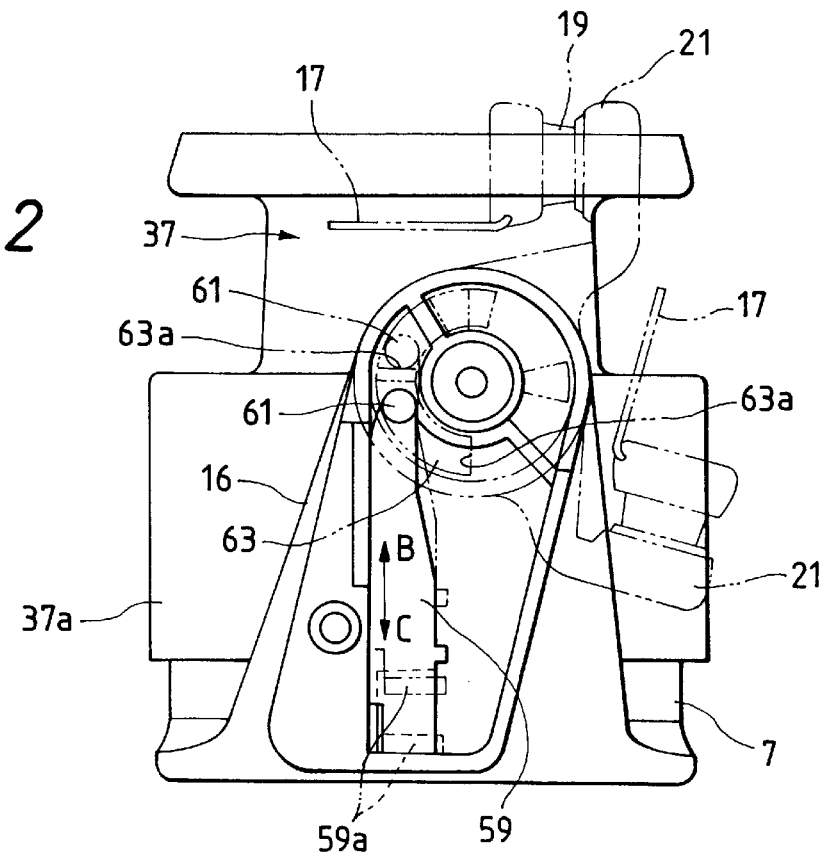
FIG. 2 is a side view of a rotor, a support arm and a spool respectively employed in the above first embodiment.
Figure 3:
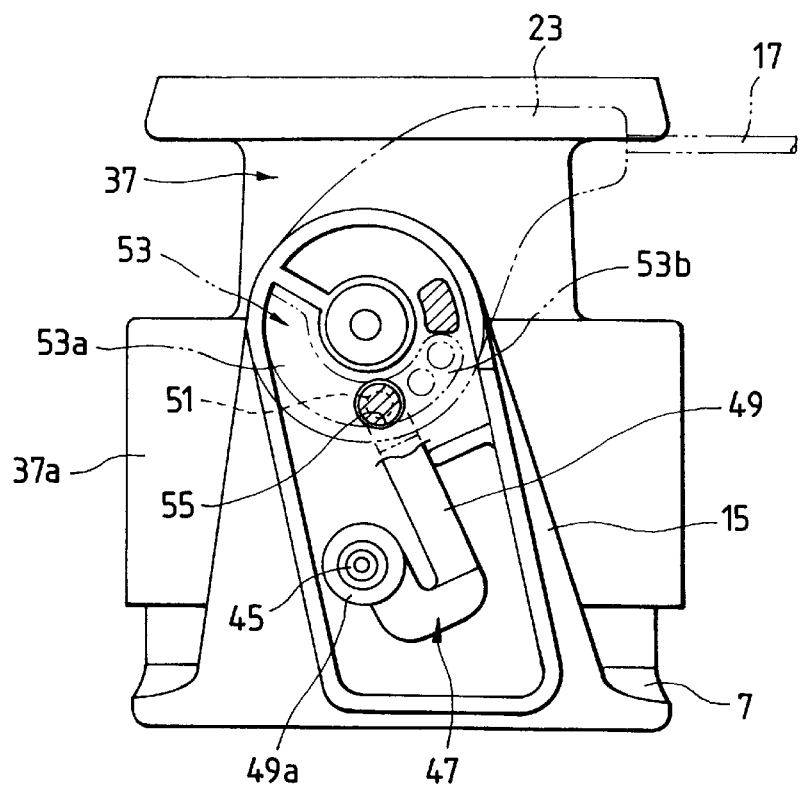
FIG. 3 is a side view of the rotor, support arm and spool when a bail is set in a fishing line retrieving state.
Figure 4:
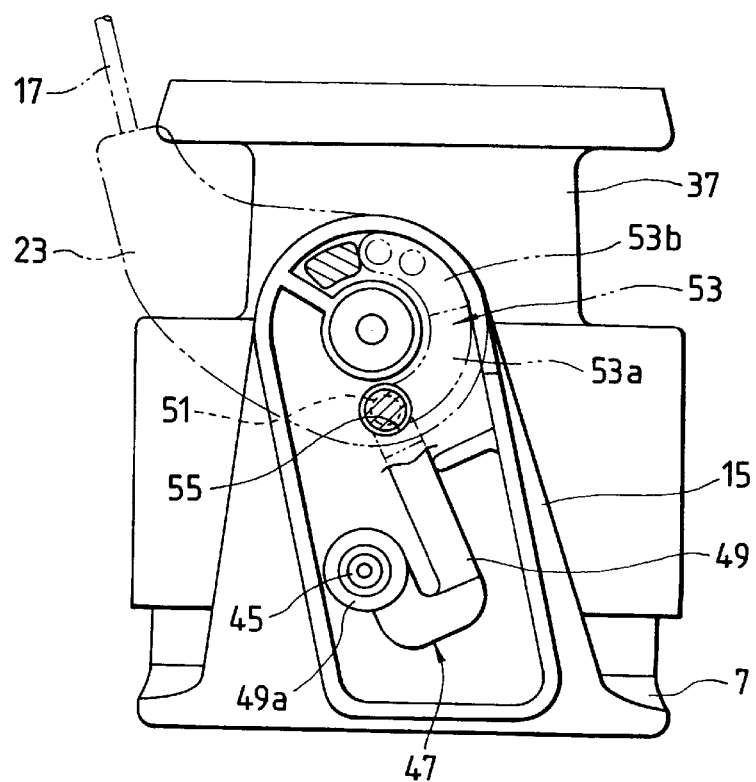
FIG. 4 is a side view of the rotor, support arm and spool when a bail is set in a fishing line casting state.

Similarly to the conventional spinning reel for fishing, the rotor 7 includes a pair of support arms 15 and 16 and, as shown in FIGS. 2 to 4, a semicircular bail 17 is mounted on the respective leading end portions of the two arms 15 and 16 through bail support members such as bail arm 21 having a line roller 19 mounted thereon and a bail holder 23 in such a manner that the bail 17 can be freely reversed between a fishing line retrieving position and a fishing line casting position.

Also, in FIG. 1, reference character 25 stands for a spool shaft which is inserted through the flier shaft 1 and is mounted on the reel main body 5. The spool shaft 25 is structured such that it can be reciprocated in the axial direction thereof when the handle 11 is operated. A spool 37 is mounted on the projecting end portion of the spool shaft 25 situated on the rotor 7 side thereof through a well-known drag device 35 which comprises a plurality of drag washers 27, a plurality of lining washers 29, a compression spring 31, a knob 33 and the like. If the spring force of the compression spring 31 to be applied to the washers 27 and 29 is adjusted by operating or turning the knob 33, then the drag force of the spool 37 with respect to the spool shaft 25 can be adjusted.

Then, similarly to the conventional spinning reel for fishing, after the bail 17 is operated or reversed to the fishing line retrieving position as shown in FIG. 3, if the handle 11 is operated to thereby rotate the rotor 7 in the fishing line retrieving direction, then a fishing line can be wound around the spool 37 which reciprocates back and forth in accordance with the rotation of the rotor 7. Also, as shown in FIG. 4, if the bail 17 is reversed to the fishing line casting position side and the terminal tackles of the fishing reel are then thrown, then the fishing line wound around the spool 37 can be released in a spiral manner.

Accordingly, a spinning reel 39 according to the present embodiment has not only the above-mentioned structure similar to the conventional spinning reel but also the following characteristics.

That is, in FIG. 1, 41 designates a cover for covering a recessed portion 43 which is formed in the outside portion of the support arm 15. The cover 41, as shown in FIG. 5, is screwed to a cylindrical support portion 45 which is provided on and projects from the inner surface of the recessed portion 43 of the cover 41.

Also, within the recessed portion 43, there is mounted a brake member 47 which is used to prevent the bail 17 from being operated in error when the fishing line is released. As shown in FIGS. 3 and 5, the brake member 47 comprises a deformable brake member main body 49, which is formed in a substantially J shape and has flexibility, and a cylindrically shaped brake portion 51 mounted on the leading end portion of the brake member main body 49. The brake member main body 49 includes a cylindrical portion 49a formed in the base portion thereof. With the cylindrical portion 49a in engagement with the support portion 45, the brake member main body 49 is fixedly secured to the support arm 15 together with the cover 41.

Figure 6:
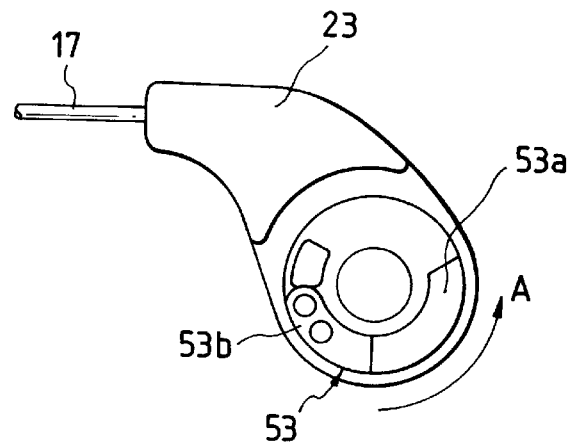
FIG. 6 is a side view of the inside of a bail holder employed in the above embodiment.
Figure 7:
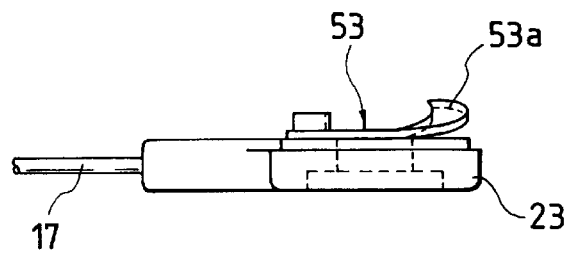
FIG. 7 is a plan view of the bail holder shown in FIG. 6.

On the other hand, as shown in FIGS. 6 and 7, an arc-shaped plate spring 53 is fixed to the back surface side of the bail holder 23 to be mounted on the leading end portion of the support arm 15. The arc-shaped plate spring 53 includes a slanting surface 53a, the leading end side of which projects sequentially in the direction of the spool 37 from the fishing line retrieving position of the bail 17 toward the fishing line casting position thereof (in FIGS. 6, in the direction of an arrow A).

Figure 5:
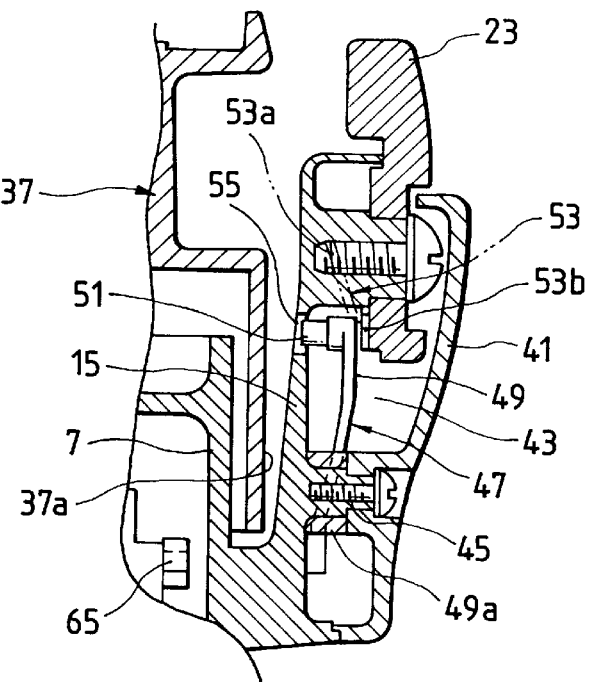
FIG. 5 is a side view of the main portions of the rotor, support arm and spool when a bail is set in the fishing line retrieving state.
Figure 8:
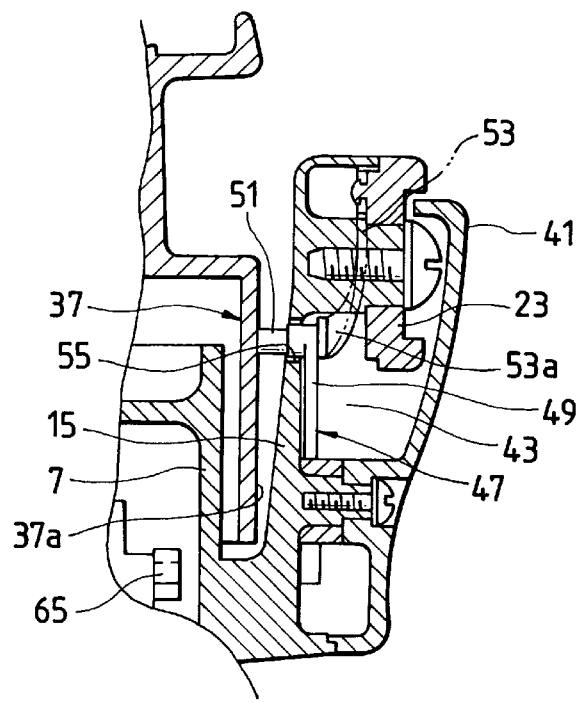
FIG. 8 is a section view of the main portions of the support arm, rotor and spool when the bail is set in the fishing line casting state.

As shown in FIGS. 3 and 5, when the bail 17 is held at the fishing line retrieving position, the leading end portion of the brake member main body 49 is positioned on the flat surface 53b of the plate spring 53 that is situated on the base portion side thereof. As shown in FIGS. 4 and 8, if the bail 17 is swung down to the fishing line casting position side, then the brake member main body 49 is sequentially pressed against and deformed by the slanting surface 53a of the plate spring 53 and, in connection with such deformation of the brake member main body 49, the brake portion 51 is urged in the spool 37 direction through a brake portion insertion hole 55 formed in the support arm 15, so that the brake portion 51 presses against the outer periphery of the cylindrical portion 37a of the spool 37. Then, as shown in FIGS. 3 and 5, if the bail 17 is returned back to the fishing line retrieving position, the brake member main body 49 is restored to its original shape due to its own restitutive force, so that the brake portion 51 can be stored again into the support arm 15.

As described above, according to the present embodiment, by pressing the brake portion 51 of the brake member 47 mounted on the support arm 15 against the outer periphery of the cylindrical portion 37a of the spool 37 when the fishing line is released, a brake force can be applied onto the rotor 7 to thereby prevent the bail holder 23 from being reversed to the fishing line retrieving position.

Also, according to the present embodiment, in addition to the above-mentioned structure, as shown in FIG. 1, a reversing mechanism 57, which is able to reverse the bail 17 from the fishing line casting position to the fishing line retrieving position due to the rotation of the rotor 7 in the fishing line retrieving direction by means of the handle operation, is mounted on the support arm 16 on which the bail arm 21 is to be installed.

The reversing mechanism 57, as shown in FIGS. 1 and 2, comprises an actuator 59 which is installed in a recessed portion 58 formed in the outside portion of the support arm 16 and is movable in the longitudinal direction of the support arm 16. The mechanism 57 further includes an arc-shaped recessed portion 63 which is formed on the back surface side of the bail arm 21 and is arranged to receive a projection 61 provided on and projecting from the leading end portion of the actuator 59. The mechanism 57 additionally includes a cam member 65 which is provided on and projects from the front portion of the reel main body 5. In the lower end portion of the actuator 59, there is formed a bent piece 59a which is inserted through an insertion hole 67 formed in the rotor 7 and which extends toward the front portion of the reel main body 5.

Also, as shown in FIG. 2, if the bail 17 is swung from the fishing line retrieving position down to the fishing line casting position, then the engaging wall portion 63a of the recessed portion 63 that is situated on the rear end side thereof is engaged with the projection 61 to thereby move the actuator 59 in a direction of an arrow B and, as the actuator 59 is moved in the arrow B direction in this manner, the cam member 65 is positioned on the rotational path of the bent piece 59a of the actuator 59. In this state, if an angler operates the handle to thereby rotate the rotor 7 in the fishing line retrieving direction, then the cam member 65 is operated to thereby press down the actuator 59 in a direction of an arrow C. As the actuator 59 is depressed in the arrow C direction, the projection 61 of the actuator 59 engages with the engaging wall portion 63a of the recessed portion 63 so that the bail arm 21 can be reversed or returned from the fishing line casting position to the fishing line retrieving position.

Besides, in FIG. 1, reference character 69 designates a cover which covers the recessed portion 58 and is screwed to the support arm 16.

Since the spinning reel 39 according to the present embodiment is structured in this manner, similarly to the conventional spinning reel, if the bail 17 is swung down to the fishing line casting position side and the terminal tackles are thrown, then the fishing line wound around the spool 37 can be released in a spiral manner. On the other hand, if the bail 17 is operated or reversed to the fishing line retrieving position side and the handle 11 is operated to rotate the rotor 7 in the fishing line retrieving direction, then the fishing line is wound around the spool 37, which reciprocates back and forth in conjunction with the rotation of the rotor 7.

When the bail 17 is held at the fishing line retrieving position, as shown in FIG. 5, the brake portion 51 is stored within the support arm 15. In this state, as shown in FIGS. 4 and 8, if the bail 17 is swung down to the fishing line casting position side, then the brake member main body 49 of the brake member 47 is sequentially pressed against and deformed by the slanting surface of the plate spring 53 to thereby cause the brake portion 51 provided on the leading end portion of the brake member main body 49 to be moved toward the spool 37 through the brake portion insertion hole 55. The main body 49 is then pressed against the outer periphery of the cylindrical portion 37a of the spool 37, which in turn applies a brake force onto the rotor 7 to thereby prevent the bail 17 from being reversed to the fishing line retrieving position.

Also, if the bail 17 is swung down to the fishing line casting position in this manner, as shown in FIG. 2, the engaging wall portion 63a of the recessed portion 63 formed in the bail arm 21 then engages with the projection 61 of the actuator 59 to thereby move the actuator 59 in the arrow B direction, so that the cam member 65 is positioned on the rotational path of the bent portion 59a of the actuator 59.

Therefore, after the fishing line is released, if the angler operates the handle to thereby rotate the rotor 7 in the fishing line retrieving direction, then the bent piece 59a is butted against the cam member 65 to thereby cause the cam member 65 to press down the actuator 59 in the arrow C direction, so that the projection of the actuator 59 engages with the engaging wall portion 63a of the recessed portion 63 of the bail arm 21 to thereby reverse or return the bail arm 21 and bail holder 23 from their respective fishing line casting positions to their respective fishing line retrieving position. As a result, the above-mentioned brake member main body 49 is restored to its original shape due to its own restitutive force, which in turn causes the brake portion 51 of the brake member 47 to be stored again into the support arm 15.

As described above, according to the present embodiment, in one aspect thereof, the brake portion 51 of the brake member 47 installed within the support arm 15 is pressed against the outer periphery of the cylindrical portion 37a of the spool 37 to thereby apply a brake force onto the rotor 7 so as to be able to prevent the bail 17 from being reversed to the fishing line retrieving position. In another aspect thereof, the reversing mechanism 57 capable of reversing the bail 17 from the fishing line casting position to the fishing line retrieving position with the rotation of the rotor 7 in the fishing line retrieving direction by means of the handle operation is installed on the support arm 16 on which the bail arm 21 is to be mounted. Due to this, according to the present embodiment, improper operation of the bail 17 in the fishing line casting operation can be prevented and the bail 17 can be returned from the fishing line casting state to the fishing retrieving state by operating the handle. As a result, the spinning reel according to the present embodiment is greatly improved in practical use when compared with the conventional spinning reel disclosed e.g. in Japanese Utility Model Publication No. Hei. 3-16867.

Besides, in the spinning reel according to the present embodiment, since the base portion of the rotor 7 and the front portion of the reel main body 5 are simplified in structure when compared with the above-mentioned conventional spinning reel, it is possible not only to prevent the lowered strength of the respective base portions of the support arms 15 and 16 but also to increase the freedom for installation of the reversing mechanism within the rotor 7.

Figure 9:
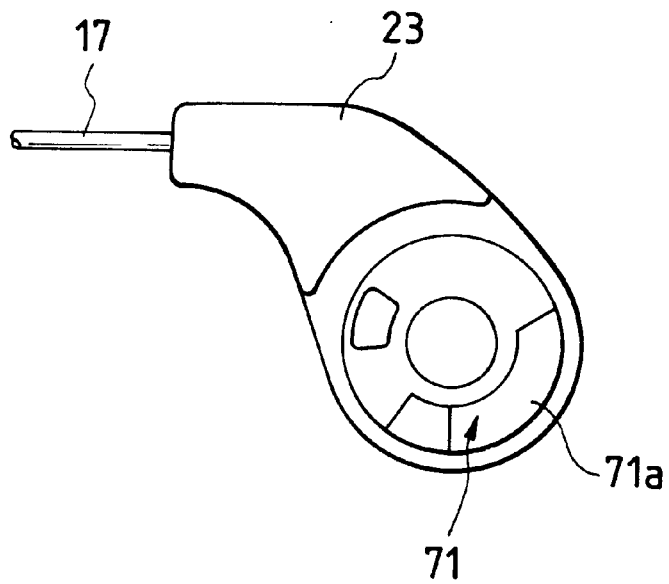
FIG. 9 is a side view of the inside of a modification of the bail holder employed in the above embodiment.
Figure 10:
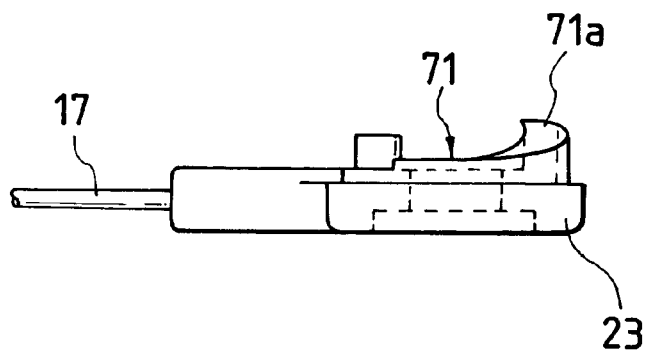
FIG. 10 is a plan view of the bail holder shown in FIG. 9.

Here, in the present embodiment, as shown in FIGS. 6 and 7, on the back surface side of the bail holder 23, there is mounted the arc-shaped plate spring 53 including the slanting surface 53a the leading end side of which is sequentially urged in the spool 37 direction from the fishing line retrieving position toward the fishing line casting position. However, this is not limitative but, for example, instead of the plate spring 53, as shown in FIGS. 9 and 10, on the back surface side of the bail holder 23, there may be mounted an arc-shaped cam member 71 including a slanting surface 71a a the leading end side of which projects sequentially further in the spool 37 direction as the bail is moved from the fishing line retrieving position toward the fishing line casting position.

Also, in place of the above-mentioned reversing mechanism 57, there may be employed a conventionally well-known outward-kick type reversing mechanism in which a reversing projection for reversing the bail arm 23 from the fishing line casting state to the fishing line retrieving state is provided on the leg portion 5a of the reel main body 5.

Figure 11:
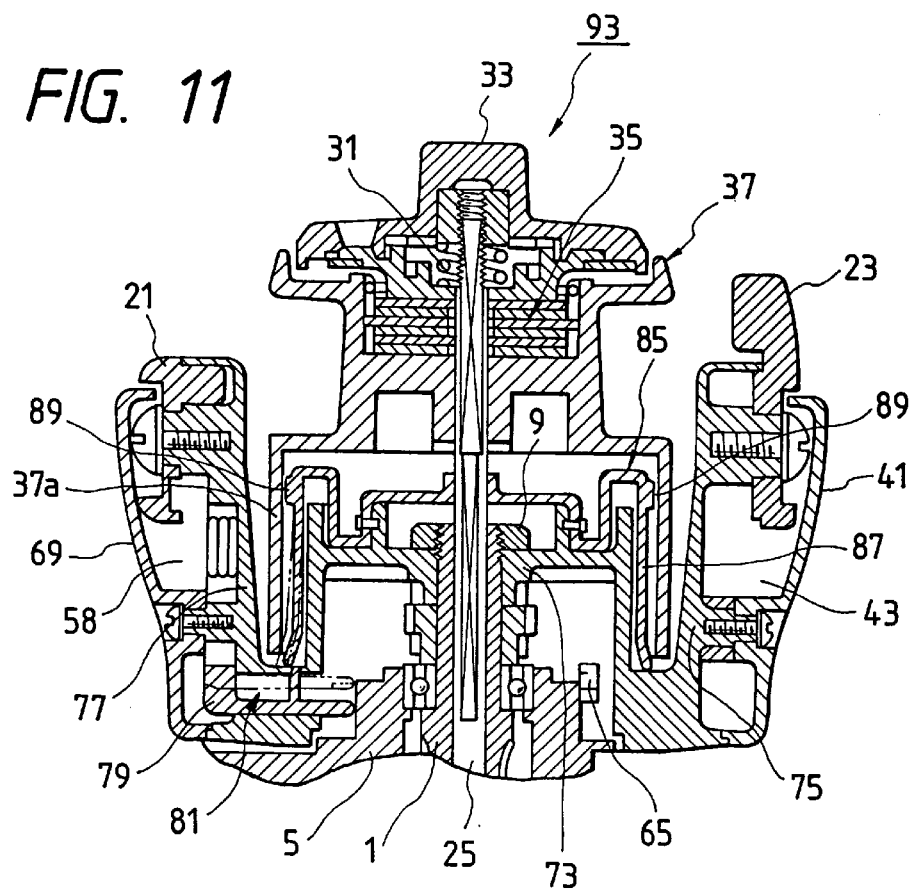
FIG. 11 a section view of the main portions of a second embodiment of a spinning reel for fishing according to the invention.
Figure 12:
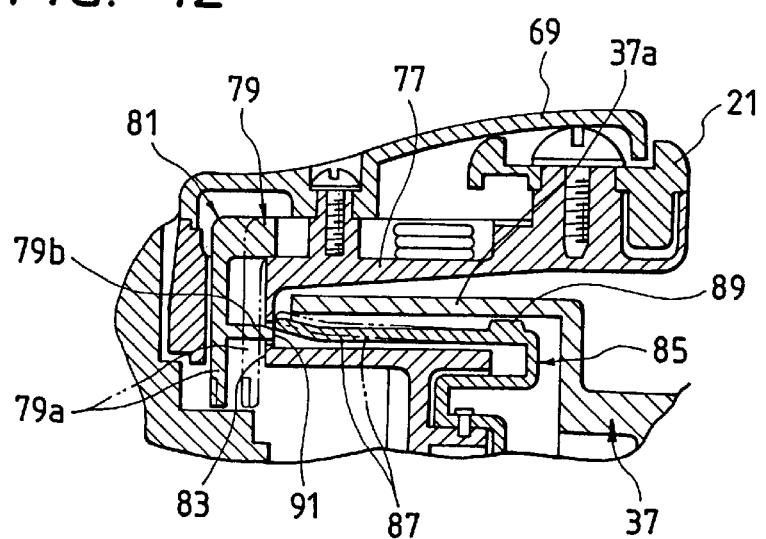
FIG. 12 is a section view of the main portions of a support arm, a rotor, and a spool respectively employed the spinning reel for fishing shown in FIG. 11.

Now, referring to FIGS. 11 and 12, there is shown a second embodiment of a spinning reel for fishing according to the invention. From now on, description will be given below in detail of the present embodiment with reference to FIGS. 11 and 12. However, in the present embodiment, the same parts as those employed in the previous embodiment are given the same designations and thus the structural description thereof is omitted here.

In FIGS. 11 and 12, reference character 73 designates a rotor which is fixedly secured to the leading end portion of a flier shaft 1 by a nut 9 and includes a pair of support arms 75 and 77; and, a bail 17 is mounted on the pair of support arms 75 and 77 in such a manner that it can be freely reversed between a fishing line retrieving position and a fishing line casting position through a bail holder 23 and a bail arm 21.

Also, in these figures, similarly to the above-mentioned actuator 59, reference character 79 stands for an actuator forming part of a reversing mechanism 81 which reverses the bail 17 from the fishing line casting position to the fishing line retrieving position due to the rotation of the rotor 73 in a fishing line retrieving direction by means of the operation of a handle 11. That is, the reversing mechanism 81 according to the present embodiment also comprises the actuator 79 which is mounted in a recessed portion 58 formed in the outside portion of the bail support arm 77 and which can be moved in the longitudinal direction of the bail support arm 77. As in the first embodiment, the reversing mechanism 81 further includes an arc-shaped recessed portion 63 which is formed on the back surface side of the bail arm 21 and also into which a projection 61 provided on projecting from the leading end portion of the actuator 79 can be fitted. The reversing mechanism also includes a cam member 65 which is mounted on the front portion of a reel main body 5. In the lower end portion of the actuator 79, there is formed a bent piece 79a which is inserted through an insertion hole 83 formed in the rotor 73 and extends toward the front portion of the reel main body 5 and, in the bent piece 79a, there is provided a brake member operation piece 79b which extends into an area between the rotor 73 and the cylindrical portion 37a of a spool 37.

Similarly to the previous embodiment, if the bail 17 is set from the fishing line retrieving position down to the fishing line casting position, then the engaging wall portion 63a of the recessed portion 63 engages with the projection 61 of the actuator 79 to thereby move the actuator 79 forwardly of the support arm 77. As the actuator 79 is moved forwardly in this manner, the cam member 65 is positioned on the rotational path of the bent portion 79a of the actuator 79. Then, in this state, if an angler operates the handle 11 to thereby rotate the rotor 73 in the fishing line retrieving direction, then the cam member 65 is operated to thereby press down the actuator 79 backwardly. As the actuator 79 is depressed backwardly in this manner, the projection 61 of the actuator 79 engages with the engaging wall portion 63a of the recessed portion 63 of the bail arm 21, thereby causing the bail arm 21 to be reversed or returned from the fishing line casting position to the fishing line retrieving position.

Also, in FIG. 11, reference character 85 designates a brake member which covers the outer periphery of the rotor 73 and is fixedly secured to the front wall portion of the present rotor 73. In particular, the brake member 85 includes a cylindrical brake member main body 87 so formed as to have a substantially U-shaped section, and an annular brake portion 89 formed integrally with the leading end side of the outer periphery of the brake member main body 87, while the present brake portion 89 is formed in a shape which projects in the inner peripheral direction of the cylindrical portion 37a of the spool 37.

Further, as shown in FIG. 12, the rear end portion of the brake member main body 87 is slightly curved outwardly and, as described above, if the bail 17 is raised from the fishing line retrieving position up to the fishing line casting position to thereby move the actuator 79 forwardly, then the brake member operation piece 79b provided on the bent portion 79a is caused to project through an insertion hole 91 formed in the rotor 73. That is, the present embodiment is characterized in that the brake member operation piece 79b, arranged so as to project from the insertion hole 91 in this manner, deforms and shifts the rear end portion of the brake member main body 87 outwardly as shown by a two-dot chained line to thereby press the brake portion 89 against the inner periphery of the cylindrical portion 37a of the spool 37.

Since the spinning reel 93 according to the present embodiment is structured in this manner, similarly to the previous embodiment, if the bail 17 is swung down to the fishing line casting position side and the terminal tackles are thrown, then the fishing line wound around the spool 37 can be released in a spiral manner. On the other hand, if the bail 17 is returned back to the fishing line retrieving position side and the rotor 73 is rotated in the fishing line retrieving direction by means of the operation of the handle 11, then the fishing line can be wound around the spool 37 which reciprocates back and forth in cooperation with the rotation of the rotor 7.

Also, although, when the bail 17 is set at the fishing line retrieving position, as shown in FIG. 11, the brake portion 89 of the brake member 85 is spaced apart from the inner periphery of the cylindrical portion 37a of the spool 37, if the bail 17 is swung down to the fishing line casting position side, then the actuator 79 is moved forwardly of the support arm 77, so that the brake member operation piece 79b provided on the bent piece 79a deforms and shifts the brake member main body 87 as shown by the two-dot chained line to thereby press the brake portion 89 of the brake member 85 against the inner periphery of the cylindrical portion 37a of the spool 37. As a result, a brake force is applied to the rotor to thereby prevent the bail holder 23 from being reversed to the fishing line retrieving position.

After the fishing line is released, if an angler operates the handle 11 to thereby rotate the rotor 73 in the fishing line retrieving direction, then the bent piece 79a is butted against the cam member 65 to thereby cause the cam member 65 to press down the actuator 79 backwardly, so that the projection 61 of the actuator 79 engages with the engaging wall portion 63a of the recessed portion 63 to thereby reverse or return the bail arm 21 and bail holder 23 from the fishing line casting position to the fishing line retrieving position. As a result, the above-mentioned brake member main body 87 is restored to its original shape due to its own restitutive force, so that the brake portion 89 can be separated from the cylindrical portion 37a of the spool 37.

As described above, in the spinning reel according to the present embodiment, when the fishing line is released, the brake portion 89 of the brake member 85 fixed to the front wall portion of the rotor 73 is pressed against the inner periphery of the cylindrical portion 37a of the spool 37 to thereby apply a brake force onto the rotor 73 so as to be able to prevent the bail 17 from being reversed to the fishing line retrieving position. At the same time, the reversing mechanism 81 for reversing the bail 17 from the fishing line casting position to the fishing line retrieving position due to the rotation of the rotor 73 in the fishing line retrieving direction by means of the operation of the handle 11 is mounted on the support arm 77 on which the bail arm 21 is installed. Due to this, with use of the present embodiment as well, it is possible to prevent the unwanted operation of the bail 17 when the fishing line is released. It is further possible, as the rotor 73 is rotated in the fishing line retrieving direction by means of the operation of the handle 11, to return the bail 17 from the fishing line casting state to the fishing line retrieving state, whereby the efficiency of the fishing operation of the present spinning reel is improved.

Also, according to the present embodiment, since the brake portion 89 is pressed against the inner periphery of the cylindrical portion 37a of the spool 37, the entire arrangement is less exposed to seawater, water, foreign matter or the like. It is thereby possible to brake the rotation of the rotor 73 more stably as compared with the embodiment shown in FIG. 1.

Figure 13:
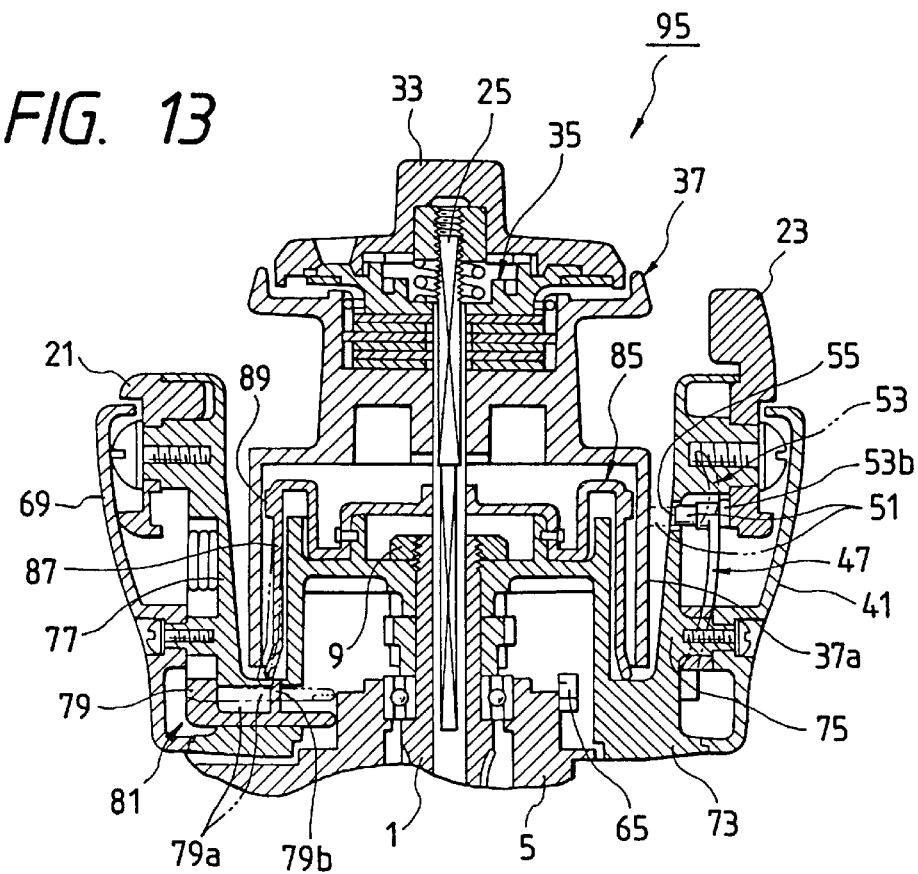
FIG. 13 is a section view of the main portions of a third embodiment of a spinning reel for fishing according to the invention.

In FIG. 13, there is shown a third embodiment of a spinning reel according to the present invention, in which the brake members 47 and 85 employed in the above-mentioned respective embodiments are combined with the reversing mechanism 81 of the last-mentioned embodiment. Since the structure of this embodiment is similar to those of the above-mentioned respective embodiments, the same parts are given the same designations and the description thereof is omitted here.

Thus, with use of the spinning reel 95 according to the present embodiment as well, similarly to the above-mentioned respective embodiments, the expected object of the invention can be achieved.

Now, referring to FIGS. 14 to 17, there is shown a fourth embodiment of a spinning reel for fishing according to the invention. In particular, in FIG. 14, reference character 97 designates a bail holder to be mounted on the leading end portion of a support arm 101 which is in turn provided on the rotor 99, while 103 stands for a recessed portion which is formed in the outside portion of the support arm 101. An actuator member 109, which forms part of a reversing mechanism 107 for reversing a bail from a fishing line casting position to a fishing line retrieving position, is rotatably mounted on a support shaft 105 which is provided on and projects from the inner surface of the recessed portion 103.

Figure 14:
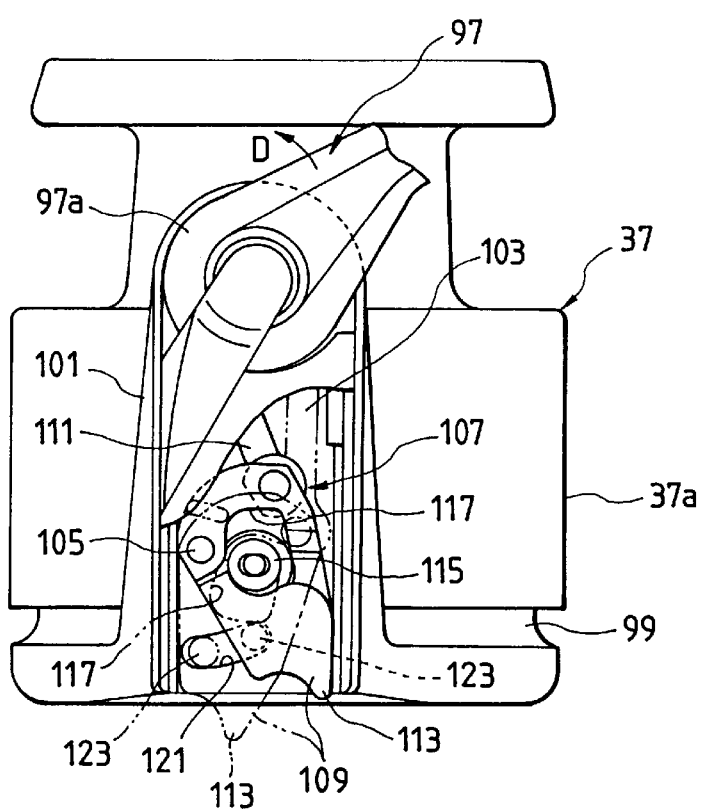
FIG. 14 is a cut-away side view of the main portions of a rotor, a spool and a support arm respectively employed in a fourth embodiment of a spinning reel for fishing according to the invention.

The actuator member 109 is connected to the base portion 97a of the bail holder 97 through a connecting member 111 and, as shown in FIG. 14, while the bail holder 97 is set in the fishing line retrieving state, the actuator member 109 is in contact with one side surface of the recessed portion 103 to thereby be able to position and hold the bail holder 97. If the bail holder 97 is swung down to the fishing line casting position side (in FIG. 14, in a direction of an arrow D), then the actuator member 109 is rotated about the support shaft 105 in such a manner as shown by a two-dot chained line so that an engaging portion 113 of the actuator member 109 extending on the rear end side thereof is caused to project in a direction of the reel main body from the rear end of the support arm 101.

Also, although not shown, in the leg portion of the reel main body, similarly to the conventionally well-known outward-kick type reversing mechanism, there is provided a reversing projection and, while the bail holder 97 is set in the fishing line casting position, if an angler operates the handle to thereby rotate the rotor 99 in the fishing line retrieving direction, then the engaging portion 113 of the actuator member 109 engages with the present reversing projection, so that the actuator member 109 is rotated about the support shaft 105 and is thereby returned to the position shown by a solid line. In conjunction with the returning motion of the actuator member 109, the bail holder 97 is reversed and returned to the fishing line retrieving position through the connecting member 111.

Figure 15:
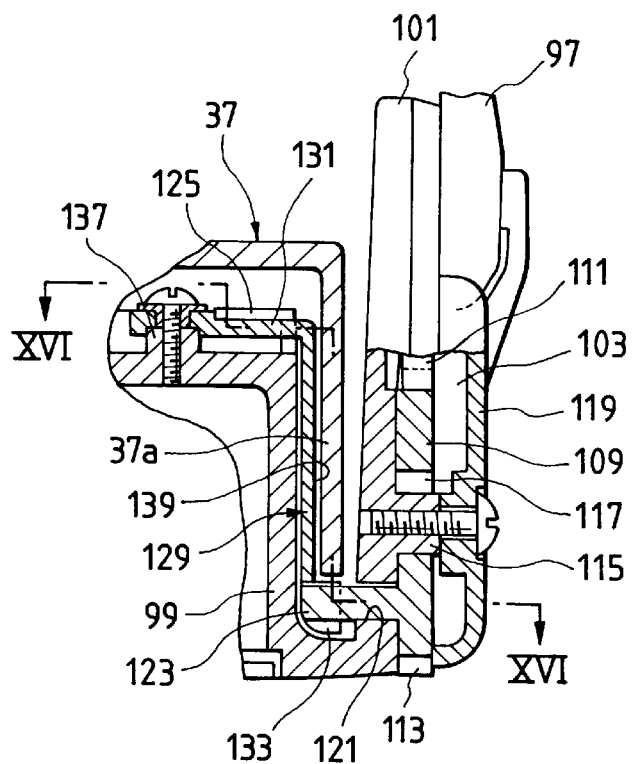
FIG. 15 is a section view of the main portions of the support arm, rotor and spool when a bail is set in the fishing line retrieving state, in the embodiment shown in FIG. 14.

In FIG. 14, reference character 115 designates a mounting shaft which is inserted through an elongated hole 117 formed in the actuator member 109 and, as shown in FIG. 15, a cover 119 for covering the recessed portion 103 is attached on the present mounting shaft 115.

Figure 16:
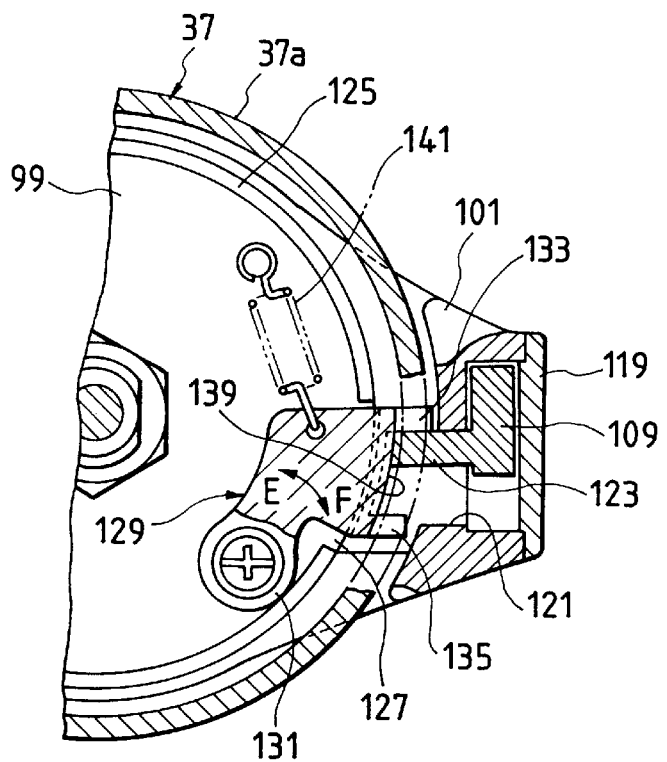
FIG. 16 is a section view taken along the line XVI—XVI shown in FIG. 15.

Also, as shown in FIGS. 14 to 16, on the back surface side of the actuator member 109, there is provided an engaging projection 123 which extends toward the rear end of the cylindrical portion 37a of the spool 37 and also extends through an arc-shaped guide hole 121 formed in the support arm 101.

On the other hand, as shown in FIGS. 15 and 16, an annular flange 125 is erected on the peripheral edge of the front wall portion of the rotor 99 and, in the flange 125, there is formed a cut-away portion 127 in such a manner that it corresponds to the support arm 101. Within the cut-away portion 127, there is installed a brake member 129 which is used to brake the rotation of the rotor 99.

The brake member 129, as shown in FIG. 15, includes a brake member main body 131 having a substantially L-shaped section so formed as to correspond to the outer shape of the rotor 99, and two engaging portions 133 and 135 which are respectively formed in the rear end portion of the brake member main body 131 in such a manner that they extend in parallel to each other and in the axial direction of the rotor 99. As shown in FIG. 16, the two engaging portions 133 and 135 are opposed to each other with a slightly narrower gap than the above-mentioned guide hole 121 between them and project respectively outwardly from the rear end of the cylindrical portion 37a of the spool 37. Also, the brake member 129 is supported in the cut-away portion 127 in such a manner that it can be rotated about a support shaft 137 provided in the front wall of the rotor 99, that is, it can be shifted in position in directions of arrows E and F.

Figure 17:
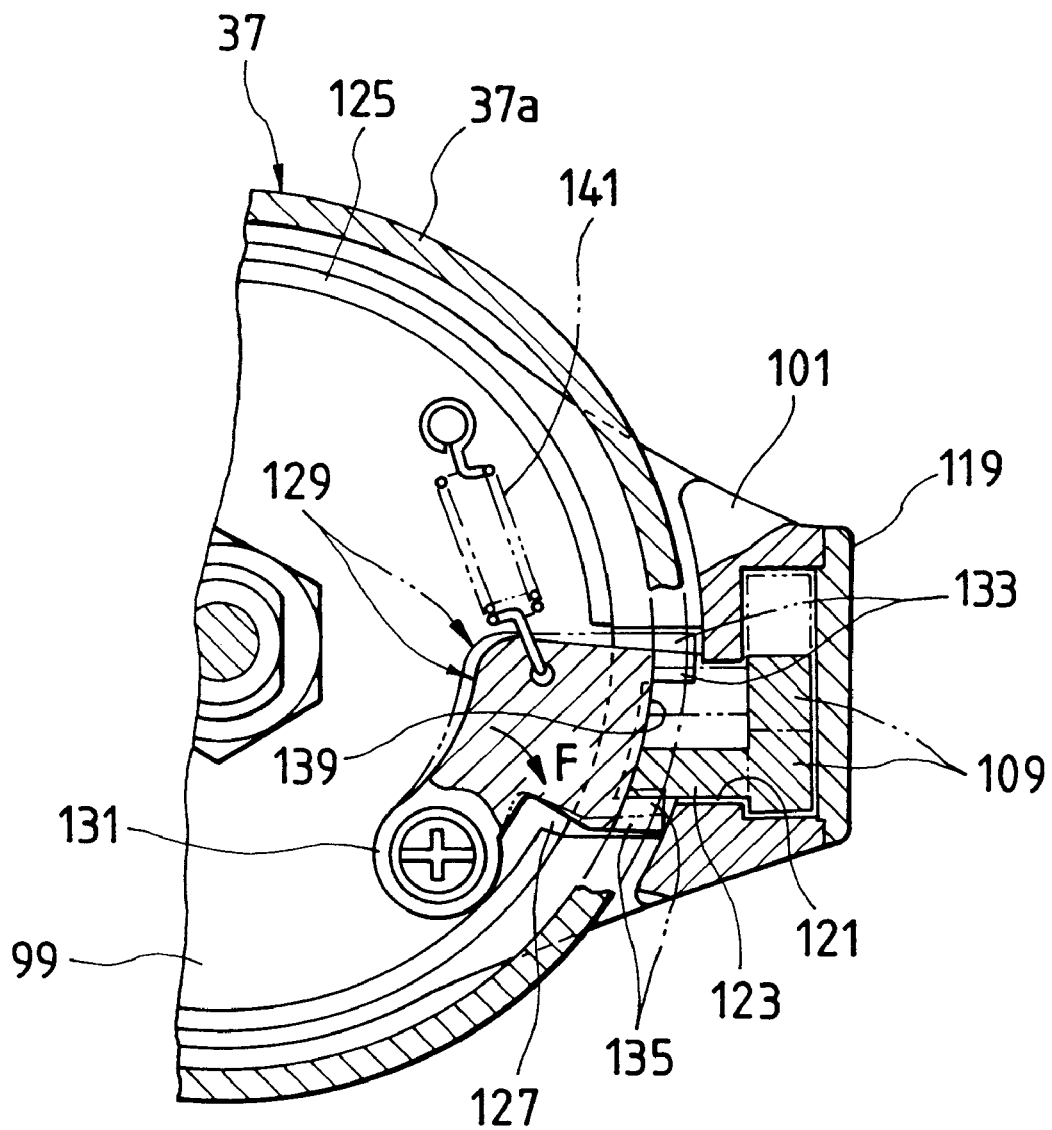
FIG. 17 is a section view of the main portions of the support arm and spool when the bail is set in the fishing line casting state, in the embodiment shown in FIG. 14.

Further, as shown in FIG. 16, the brake member 129 includes, in the portion thereof that is opposed to the cylindrical portion 37a of the spool 37, a brake portion 139 which is so formed as to extend along the inner peripheral shape of the present cylindrical portion 37a. When the bail holder 97 is set at the fishing line casting position, the brake member 129, as shown in FIG. 17, is energized in a direction of an arrow F due to the spring force of a coil spring 141 provided between the rotor 99 and itself, so that the brake portion 139 of the brake member 129 can be pressed against the inner periphery of the cylindrical portion 37a of the spool 37.

Moreover, the engaging projection 123 provided in the actuator member 109 projects between the two engaging portions 133 and 135 of the brake member 129 and, if the bail holder 97 is returned to the fishing line retrieving position from the fishing line casting position, then the engaging projection 123 of the actuator member 109 engages with the engaging portion 133 of the brake member 129 in conjunction with the movement of the actuator member 109 to thereby move the brake member 129 in the arrow E direction against the spring force of the coil spring 141, the result that, as shown in FIG. 16, the brake portion 139 of the brake member 129 is separated from the inner periphery of the cylindrical portion 37a of the spool 37.

Since the spinning reel according to the present embodiment is structured in this manner, when the bail holder 97 is held at the fishing line retrieving position, as shown in FIG. 16, the brake portion 139 of the brake member 129 is separated from the inner periphery of the cylindrical portion 37a of the spool 37. However, if the bail holder 97 is swung down to the fishing line casting position side, then the actuator member 109 is moved and thus the engaging projection 123 of the actuator member 109 is moved along the guide hole 121 of the support arm 101 as shown in FIG. 17. This causes the brake member 129 to be moved in the arrow F direction due to the spring force of the coil spring 141 and thus the brake portion 139 of the brake member 129 is pressed against the inner periphery of the cylindrical portion 37a of the spool 37. As a result, a brake force is applied onto the rotor 99 to thereby be able to prevent the bail from being reversed to the fishing line retrieving position.

Also, if the bail holder 97 is swung down to the fishing line casting position side in this manner, as shown in FIG. 14, the engaging portion 113 of the actuator member 109 then projects in the reel main body direction from the rear end of the support arm 101.

After the fishing line is released, if an angler operates the handle to thereby rotate the rotor 99 in the fishing line retrieving direction, then the engaging portion 113 of the actuator member 109 engages with the reversing projection of the reel main body, so that the actuator member 109 is rotated about the support shaft 105 to return to the position shown by a solid line in FIG. 14. As a result of the returning motion of the actuator member 109, the bail holder 97 is reversed and returned to the fishing line retrieving position through the connecting member 111. As a result, as shown in FIG. 16, the brake portion 139 of the brake member 129 is separated from the inner periphery of the cylindrical portion 37a of the spool 37 by the engaging projection 123 of the actuator member 109, thereby removing the braked state of the rotor 99 held by the brake member 129.

As described above, in the spinning reel according to the present embodiment as well, by bringing the brake portion 139 of the brake member 129 against the inner periphery of the cylindrical portion 37a of the spool 37 in the fishing line casting operation, a brake force can be applied onto the rotor 99 to thereby prevent the bail from being reversed to the fishing line retrieving position. In addition, there is provided the reversing mechanism 107 which is capable of reversing the bail from the fishing line casting position to the fishing line retrieving position due to the rotation of the rotor 99 in the fishing line retrieving direction by means of the operation of the handle 11. This makes it possible to prevent the inadvertent operation of the bail in the fishing line casting operation and also to return the bail from the fishing line casting state to the fishing line retrieving state by means of the operation of the handle 11, thereby being able to improve the efficiency of the fishing operation of the present spinning reel for fishing.

Also, according to the present embodiment as well, in order to apply a brakeforce to the rotor 99, the brake portion 139 of the brake member 129 is pressed against the inner periphery of the cylindrical portion 37a of the spool 37, which is not so exposed to seawater, water, foreign matter or the like, unlike the outer periphery of the present cylindrical portion 37a. As a result, the rotation of the rotor 99 can be braked more stably as compared with the embodiment shown in FIG. 1.

Besides, according to the spinning reel of the present embodiment as well, similarly to the embodiment shown in FIG. 1, since the base portion of the rotor 99 and the front portion of the reel main body are simplified in structure over the above-mentioned conventional spinning reel, not only the lowered strength of the base portion of the support arm 101 can be prevented but also there is increased a freedom for installation of the reversing mechanism within the rotor 99.

As has been described heretofore, according to the spinning reels for fishing, not only it is possible to prevent the inadvertent operation of the bail in the fishing line casting operation, which in turn makes it possible to prevent the fishing line from being cut, but also the bail can be returned from the fishing line casting state to the fishing line retrieving state due to the rotation of the rotor in the fishing line retrieving direction by means of the handle operation. As a result, the fishing operation of the present invention can be greatly improved in efficiency as compared with the conventional spinning reel.

Also, according to the invention, since the base portion of the rotor and the front portion of the reel main body are simplified in structure, it is possible not only to prevent the lowered strength of the base portion of the bail support arm but also to increase the freedom for installation of the reversing mechanism within the rotor.

Further, according to certain embodiments of the invention, since the brake portion of the brake member is pressed against the inner periphery of the cylindrical portion of the spool, which is not so exposed to seawater, water, foreign matter or the like as the outer periphery of the present cylindrical portion, the rotation of the rotor can be braked more stably.

What is claimed is:

1. A spinning reel for fishing in which a bail is mounted on a pair of support arms provided in a rotor rotatable in accordance with operation of a handle in such a manner that said bail is reversible between a fishing line casting position and a fishing line retrieving position through a bail support member, and a fishing line is wound around a spool when said rotor is rotated in a fishing line retrieving direction, wherein said rotor includes a brake member which, when said bail support member is reversed from said fishing line retrieving position to said fishing line casting position, is pressed against an inner periphery of said spool to thereby brake the rotation of said rotor, wherein said rotor includes a reversing mechanism for returning said bail support member from said fishing line casting position to said fishing line retrieving position through rotation of said rotor in said fishing line retrieving direction, wherein said brake member comprises:

a brake member main body fixedly secured to a front wall portion of said rotor and shiftable in position as said bail support member is moved between said fishing line retrieving position and said fishing line casting position, and a brake portion provided in said brake member main body, and wherein said brake portion, as said bail support member is reversed from said fishing line retrieving position to said fishing line casting position, is shifted in position toward a cylindrical portion of said spool to be thereby pressed against said cylindrical portion of said spool.

2. A spinning reel for fishing as set forth in claim 1, further comprising a further brake member which, when said bail support member is reversed from said fishing line retrieving position to said fishing line casting position, projects from inside at least one of said support arms toward said spool to be thereby pressed against an outer cylindrical portion of said spool.

3. A spinning reel for fishing as set forth in claim 2, wherein said further brake member comprises:

a further brake member main body fixedly secured inside at least one of said support arms of said rotor and deformable by means of the operation of said bail support member, and a further brake portion mounted on a leading end portion of said further brake member main body, wherein said further brake portion, when said bail support member is reversed from said fishing line retrieving position to said fishing line casting position, projects from inside said at least one support arm toward said spool to be thereby pressed against a cylindrical portion of said spool.

4. A spinning reel for fishing as set forth in claim 3, wherein the cylindrical portion of said spool is a smooth outer cylindrical surface of said spool.

5. A spinning reel for fishing comprising:

a spool;

a rotor rotatable in cooperation with operation of a handle for winding a fishing line around the spool;

a bail pivotable with respect to the rotor and movable between a fishing line casting position and a fishing line retrieving position; and a brake member fixedly secured to a front wall portion of the rotor, wherein the brake member is brought into pressure contact with an inner periphery of the spool in accordance with movement of the bail from the fishing line retrieving position to the fishing line casting position and wherein the brake member is released from the spool in accordance with movement of the bail from the fishing line casting position to the fishing line retrieving position.

6. A spinning reel for fishing according to claim 5, wherein the brake member includes a brake member main body and a brake portion provided on the brake member main body, and the brake member main body is attached to the rotor so that the brake portion is brought into pressure contact with the spool in accordance with movement of the bail from the fishing line retrieving position to the fishing line casting position.

7. A spinning reel for fishing according to claim 5, wherein the brake portion is movable substantially radially with respect to the rotor.

8. A spinning reel for fishing according to claim 6, wherein the brake portion is brought into pressure contact with an inner periphery of a cylindrical skirt portion of the spool.

9. A spinning reel for fishing according to claim 5, further comprising:

a reversing mechanism activated in accordance with rotation of the handle for returning the bail from the fishing line casting position back to the fishing line retrieving position and thereby causing the brake member to be released from the spool.

10. A spinning reel for fishing according to claim 5, further comprising:

a bail support member to which an end of the bail is fixed and which is pivotably supported on the rotor; and cam means rotatable in accordance with a pivot motion of the bail support member for driving the brake member toward and away from the spool.

11. A spinning reel for fishing comprising:

a spool;

a rotor rotatable in cooperation with operation of a handle for winding a fishing line around the spool;

a bail pivotable with respect to the rotor and movable between a fishing line casting position and a fishing line retrieving position;

a brake member provided on the rotor, wherein the brake member is brought into pressure contact with an inner periphery of the spool in accordance with movement of the bail from the fishing line retrieving position to the fishing line casting position and wherein the brake member is released from the spool in accordance with movement of the bail from the fishing line casting position to the fishing line retrieving position; and a further brake member, wherein the further brake member includes a further brake member main body and a further brake portion, and the further brake portion is brought into pressure contact with an outer periphery of a cylindrical skirt portion of the spool.

12. A spinning reel for fishing according to claim 11, wherein the outer periphery of the cylindrical skirt portion of the spool is a smooth cylindrical surface.

13. A spinning reel for fishing comprising:

a spool;

a rotor rotatable in cooperation with operation of a handle for winding a fishing line around the spool;

a bail structure including a bail pivotable with respect to the rotor and movable between a fishing line casting position and a fishing line retrieving position and further including a cam; and a brake member provided on the rotor and including an elastically deformable brake member main body with a brake pad;

wherein movement of the bail structure from the fishing line retrieving position to the fishing line casting position brings the cam into pressure contact with the brake member main body and thereby elastically deforms the brake member main body, to bring the brake pad into pressure contact with the spool; and wherein movement of the bail structure from the fishing line casting position to the fishing line retrieving position returns the cam from the pressure contact with the brake member main body to thereby retract the brake pad from the spool.

14. A spinning reel for fishing according to claim 13, further comprising:

a pair of support arms provided on the rotor and supporting said bail structure; and wherein said brake member is housed in one of the support arms.

15. A spinning reel for fishing according to claim 14, wherein said brake member main body has a first distal end fixed to an interior surface of the one support arm, and has a second distal end that is free and supports the brake pad.

16. A spinning reel for fishing according to claim 15, wherein the cam is positioned to be brought into pressure contact with the brake member main body at the free, second distal end.

17. A spinning reel for fishing according to claim 13, wherein the brake pad is brought into pressure contact with a smooth outer cylindrical surface of the spool.

* * * * *